Patented May 22, 1934

1,960,115

UNITED STATES PATENT OFFICE 1,960,115

AQUEOUS BITUMINOUS DISPERSIONS AND PROCESS OF MAKING SAME

Zanvil C. Loebel, New York, N. Y., assignor, by mesne assignments, to The Patent and Licensing Corporation, New York, N. Y., a corporation of Massachusetts No Drawing. Application October 8, 1928,
Serial No. 311,260

4 Claims. (Cl. 134—1)

This invention relates to dispersions of bituminous material in water and has more particular relation to improvements in the production of dispersions of this type made with the aid of dispersing agents, in the presence of which the dispersion product tends to become set or gelled to a more or less rigid structure which renders the product unfit for use without a severe stirring or agitating action for dissipating the gelled condition.

Dispersions of bitumen made with materials such as gelatin, as the dispersing media, are further characterized by the relative weakness of the water-free film thereof and its susceptibility to redispersion upon more or less prolonged contact with water. I find that with the use of gelatin it is possible to disperse bituminous material such as asphalt in quantities as high as 150 to 500 parts of the bitumen for each part of gelatin employed to aid in the dispersion. The dispersion is best carried out by adding the bitumen in heat liquefied condition to a relatively thick suspension of gelatin and water and agitating the mass in any suitable form of dispersing apparatus while continuing the addition of the bitumen. The ability of the gelatin to disperse such large quantities of the base for a given amount of the dispersing agent is quite desirable not only from the standpoint that it entails the use and manipulation of relatively insignificant quantities of the dispersing agent, but an additional advantage is afforded in that the dispersion product, when dried in the form of a thin layer, contains such a small amount of the dispersing agent that it possesses the maximum resistance to redispersion under the continued action or play of water upon the dried film, and the film is otherwise impermeable, tight and adherent to the surface with which it is associated. Dispersions of this character are also reasonably stable to electrolytes such as acid and alkalies and materials such as Portland cement, or the like. Even with such low percentages of the dispersing media, however, these dispersions possess such a strong tendency to gellify to a more or less rigid condition, upon standing, as to constitute a serious hindrance to their general adoption for commercial use.

I have found in accordance with my present invention, that dispersions of the type made with gelatin, or other dispersing agents which have the same gellifying effect upon the dispersion product as does gelatin, can be produced with a treatment which will effectually prevent the gellation of the dispersion product. The treatment, in accordance herewith, resides in the use of certain agents in very small quantities which will function to inhibit the gellation in the dispersion. Dispersions of this type which ordinarily set up to quite a rigid gelled condition within a few hours, or over night, can be made by my invention to retain their original viscosity and be protected against gellation for weeks or even entirely. While a large number of substances might be employed for this treatment, my invention comprehends the use of materials which while functioning as inhibitors of gellation in the dispersion product, will nevertheless not impair in any way the impermeability of the water-free film of the dispersion of its ability to withstand redispersion upon continued action of water. Furthermore, my invention includes the use of such reagents capable of preventing the gellation, which are soluble in water so that they may be readily incorporated into the aqueous external phase of the dispersion product.

As illustrating specific embodiments of my invention, I have employed for this purpose certain inorganic materials, particularly metallic salts, such as sodium chloride, magnesium chloride, potassium iodide, potassium nitrate, ammonium sulphate, sodium borate, ammonium thiocyanate, sodium benzoate, sodium acetate, and the like. I have also found certain acids such as phosphoric or the like, to be suitable for this purpose.

In employing the substances heretofore named for the purpose of my invention, they may be incorporated during the process of carrying on the dispersion by adding the same to the material undergoing dispersion, or by combining the same with the dispersing agent such as gelatin, prior to its admixture with the base being dispersed. If desired, the gellation inhibitors may be incorporated in the dispersion after it is made, but before it has been allowed to stand a sufficient length of time to permit the gellation effect to take place. These inhibitors may also, if necessary, be added after gellation has occurred in the dispersion product, in order to assist in dissipating the gelled condition.

In general, the quantity of these materials employed may range from 25 to 100% by weight of the amount of the dispersing agent contained in the dispersion product. Thus, for example, where 150 parts of asphalt having a melting point of between 100 and 200° F. has been dispersed in water with the aid of approximately one part of gelatin, 0.25 to one part of any of the substance named will be sufficient to prevent the gellation of the product.

While I have herein particularly referred to gelatin dispersions of bitumen, it is to be understood that the principles of my invention may be utilized for inhibiting gellation in dispersions made with other types of dispersing agents such as starch, casein or the like, which similarly cause gellation to take place in the dispersion upon standing and under other conditions conducive to such effect.

I claim as my invention:

1. A dispersion of bitumen in water containing gelatine as the dispersing agent, and a reagent selected from the group consisting of sodium chloride, magnesium chloride, potassium iodide, potassium nitrate, ammonium sulphate, sodium borate, ammonium thiocyanate, sodium benzoate, sodium acetate and phosphoric acid, and adapted to inhibit the gellation of the product without impairing the normal properties of the water-free film of the dispersion.

2. A dispersion of bitumen in water containing gelatine as the dispersing agent, and a reagent selected from the group consisting of sodium chloride, magnesium chloride, potassium iodide, potassium nitrate, ammonium sulphate, sodium borate, ammonium thiocyanate, sodium benzoate, sodium acetate and phosphoric acid, and adapted to inhibit the gellation of the product, said reagent being present in amounts ranging from 25 to 100% by weight of the dispersing agent.

3. A dispersion of bitumin in water containing gelatine as the dispersing agent, and a water soluble reagent selected from the group consisting of sodium chloride, magnesium chloride, potassium iodide, potassium nitrate, ammonium sulphate, sodium borate, ammonium thiocyanate, sodium benzoate, sodium acetate and phosphoric acid, and adapted to inhibit the gellation of the product without impairing the normal properties of the water-free film of the dispersions.

4. A dispersion of bitumen in water containing gelatin as the dispersion agent, the relative amount of gelatin present being sufficiently small to prevent redispersion of the water-free film of the product, said dispersion also containing a reagent selected from the group consisting of sodium chloride, magnesium chloride, potassium iodide, potassium nitrate, ammonium sulphate, sodium borate, ammonium thiocyanate, sodium benzoate, sodium acetate and phosphoric acid, and adapted to inhibit gellation of the product.

ZANVIL C. LOEBEL.